(12) United States Patent
Kimpara et al.

(10) Patent No.: US 9,225,279 B2
(45) Date of Patent: Dec. 29, 2015

(54) CONTROL APPARATUS FOR AC ROTATING MACHINE AND ELECTRICALLY-ASSISTED POWER STEERING APPARATUS PROVIDED WITH THE CONTROL APPARATUS

(75) Inventors: Yoshihiko Kimpara, Tokyo (JP); Akira Furukawa, Tokyo (JP); Shunsuke Nakajima, Tokyo (JP); Jiro Okada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/350,722

(22) PCT Filed: May 22, 2012

(86) PCT No.: PCT/JP2012/063063
§ 371 (c)(1),
(2), (4) Date: Apr. 9, 2014

(87) PCT Pub. No.: WO2013/111357
PCT Pub. Date: Aug. 1, 2013

(65) Prior Publication Data
US 2014/0253009 A1    Sep. 11, 2014

(30) Foreign Application Priority Data

Jan. 26, 2012   (JP) ................................. 2012-013682

(51) Int. Cl.
| | |
|---|---|
| *H02P 1/32* | (2006.01) |
| *H02P 3/20* | (2006.01) |
| *H02P 7/06* | (2006.01) |
| *H02P 25/22* | (2006.01) |

(Continued)

(52) U.S. Cl.
CPC ................ *H02P 25/22* (2013.01); *B62D 5/046* (2013.01); *H02P 21/0035* (2013.01)

(58) Field of Classification Search
CPC ........................................................ H02P 25/22
USPC ........................................................... 318/496
See application file for complete search history.

(56) References Cited

U.S. PATENT DOCUMENTS 3,611,085 A    10/1971  Rosenberry, Jr.
5,390,102 A  *  2/1995  Araki .............................. 363/71
(Continued)

FOREIGN PATENT DOCUMENTS

| JP | 3-253293 A | 11/1991 |
|---|---|---|
| JP | 2515903 B2 | 7/1996 |

(Continued)

OTHER PUBLICATIONS

Japanese office action for JP 2012-013682 dated Jul. 30, 2013.
(Continued)

*Primary Examiner* — Erick Glass
(74) *Attorney, Agent, or Firm* — Sughrue Mion, PLLC

(57) ABSTRACT

A control apparatus for AC rotating machine includes: a voltage command calculation means for calculating voltage commands on two rotational axes; a first voltage application means for applying voltages to first windings of a multiple-winding AC rotating machine having at least the first windings and second windings based on the voltage commands on two rotational axes output by the voltage command calculation means; and a second voltage application means for applying voltages to the second windings based on the voltage commands on two rotational axes output by the voltage command calculation means, wherein the second voltage application means applies voltages to the second windings based on the deviations between the currents fed to the first windings and the currents fed to the second windings.

5 Claims, 9 Drawing Sheets

(51) Int. Cl.
*B62D 5/04* (2006.01)
*H02P 21/00* (2006.01)

(56) References Cited

U.S. PATENT DOCUMENTS

| | | | |
|---|---|---|---|
| 2010/0301786 A1* | 12/2010 | Gallegos-Lopez et al. | 318/400.02 |
| 2011/0156623 A1* | 6/2011 | Nakamura et al. | 318/400.02 |
| 2012/0032622 A1* | 2/2012 | Lipo | 318/400.27 |

FOREIGN PATENT DOCUMENTS

| | | |
|---|---|---|
| JP | 10-225181 A | 8/1998 |
| JP | 2011-15587 A | 1/2011 |
| JP | 2011-152027 A | 8/2011 |

OTHER PUBLICATIONS

International Search Report of PCT/JP2012/063063 dated Jul. 31, 2012.

* cited by examiner

FIG.5

| M | Phase Difference | U-Phase Current | V-Phase Current | W-Phase Current | U-Phase Voltage | V-Phase Voltage | W-Phase Voltage |
|---|---|---|---|---|---|---|---|
| 1 | 60° | -iv1 | -iw1 | -iu1 | -vv1* | -vw1* | -vu1* |
| 2 | 120° | iw1 | iu1 | iv1 | vw1* | vu1* | vv1* |
| 3 | 180° | -iu1 | -iv1 | -iw1 | -vu1* | -vv1* | -vw1* |
| 4 | 240° | iv1 | iw1 | iu1 | vv1* | vw1* | vu1* |
| 5 | 300° | -iw1 | -iu1 | -iv1 | -vw1* | -vu1* | -vv1* |

FIG.7

| N | Phase Difference | U-Phase Current | V-Phase Current | W-Phase Current | U-Phase Voltage | V-Phase Voltage | W-Phase Voltage |
|---|---|---|---|---|---|---|---|
| 1 | 30° | $(iu1-iv1)/\sqrt{3}$ | $(iv1-iw1)/\sqrt{3}$ | $(iw1-iu1)/\sqrt{3}$ | $(vu1*-vv1*)/\sqrt{3}$ | $(vv1*-vw1*)/\sqrt{3}$ | $(vw1*-vu1*)/\sqrt{3}$ |
| 2 | 90° | $(iw1-iv1)/\sqrt{3}$ | $(iu1-iw1)/\sqrt{3}$ | $(iv1-iu1)/\sqrt{3}$ | $(vw1*-vv1*)/\sqrt{3}$ | $(vu1*-vw1*)/\sqrt{3}$ | $(vv1*-vu1*)/\sqrt{3}$ |
| 3 | 150° | $(iw1-iu1)/\sqrt{3}$ | $(iu1-iv1)/\sqrt{3}$ | $(iv1-iw1)/\sqrt{3}$ | $(vw1*-vu1*)/\sqrt{3}$ | $(vu1*-vv1*)/\sqrt{3}$ | $(vv1*-vw1*)/\sqrt{3}$ |
| 4 | 210° | $(iv1-iu1)/\sqrt{3}$ | $(iw1-iv1)/\sqrt{3}$ | $(iu1-iw1)/\sqrt{3}$ | $(vv1*-vu1*)/\sqrt{3}$ | $(vw1*-vv1*)/\sqrt{3}$ | $(vu1*-vw1*)/\sqrt{3}$ |
| 5 | 270° | $(iv1-iw1)/\sqrt{3}$ | $(iw1-iu1)/\sqrt{3}$ | $(iu1-iv1)/\sqrt{3}$ | $(vv1*-vw1*)/\sqrt{3}$ | $(vw1*-vu1*)/\sqrt{3}$ | $(vu1*-vv1*)/\sqrt{3}$ |
| 6 | 330° | $(iu1-iw1)/\sqrt{3}$ | $(iv1-iu1)/\sqrt{3}$ | $(iw1-iv1)/\sqrt{3}$ | $(vu1*-vw1*)/\sqrt{3}$ | $(vv1*-vu1*)/\sqrt{3}$ | $(vw1*-vv1*)/\sqrt{3}$ |

CONTROL APPARATUS FOR AC ROTATING MACHINE AND ELECTRICALLY-ASSISTED POWER STEERING APPARATUS PROVIDED WITH THE CONTROL APPARATUS

CROSS REFERENCE TO RELATED APPLICATIONS

This application is a National Stage of International Application No. PCT/JP2012/063063, filed on May 22, 2012, which claims priority from Japanese Patent Application No. 2012-013682, filed on Jan. 26, 2012, the contents of all of which are incorporated herein by reference in their entirety.

TECHNICAL FIELD

The present invention relates to a control apparatus for AC rotating machine that controls a multiple-winding AC rotating machine having at least a first winding and a second winding based on a voltage command on two rotational axes and also relates to an electrically-assisted power steering apparatus provided with the control apparatus.

BACKGROUND ART

As generally known, driving a multiple-winding AC rotating machine having a plurality of multi-phase winding sets by a plurality of inverters can increase the output power or decrease the size of a control apparatus of the AC rotating machine.

One method of current control for a multiple-winding AC rotating machine having a plurality of multi-phase winding sets is to use a separate inverter for each set of windings for current control. However, this method has a problem that magnetic coupling between the windings of each set causes interference between the output currents of the inverters, which causes ripple in the output currents particularly when the gain of a current control system is high, preventing highly responsive control.

In order to solve this problem, for example, a control apparatus for AC rotating machine described in JP-A-03-253293 (PTL 1) is configured to, while variable speed driving an AC rotating machine using a plurality of power converters, detect output currents of the power converters, calculate a sum and difference of the output currents based on the detected values and feedback the sum and difference to current adjusters of the power converters with different control gains to control the output currents of the power converters to be proportional to the command values.

Causing the control gain for the added value (average value) of the output currents of the inverters controlled by the current adjusters configured as above and provided for the respective inverters to be different from the control gain for the unbalanced gain allows the current control responsiveness for the average value of the output currents and the current control responsiveness for the unbalanced value to be separately designed in any appropriate manner. Accordingly, even when the current control of the added value (average value) of the output currents of the inverters is designed to be highly responsive in accordance with a response specification of motor torque control, the current control responsiveness of the unbalanced value of the output currents of the inverters can be always maintained to be an appropriate value, which prevents the control instability due to interference caused by magnetic coupling between the windings of each set, preventing ripple in the output currents from occurring.

However, for performing current control of a multiple-winding AC rotating machine having a plurality of multi-phase winding sets, this configuration requires the same number of coordinate transformation means and command coordinate transformation means including rotating coordinate calculation as the number of the inverters. Generally, rotating coordinate calculation intensively uses trigonometric function and the like, which causes a problem of putting a high computational load on a microcomputer.

In order to solve this problem, for example, a control apparatus for AC rotating machine described in JP-A-2011-152027 (PTL 2) includes: a DC power supply; a plurality of inverters for converting power from the DC power supply into AC power to supply to a three-phase AC rotating machine; a phase current detection means for detecting output current of the plurality of inverters; a three-phase to two-phase conversion means for converting the detected phase current values of the phases detected by the phase current detection means into d-axis and q-axis currents; a current control calculation for generating a representative two-phase voltage command value based on the detected value of the d-axis and q-axis currents converted by the three-phase to two-phase conversion means and d-axis and q-axis current command values; and a two-phase to three-phase conversion means for generating a three-phase voltage command value from the output of the current control calculation; in which both the number of the three-phase to two-phase conversion means and the number of the two-phase to three-phase conversion means are configured to be less than the number of the inverters.

Furthermore, for example, JP-A-2011-15587 (PTL 3) discloses that a multiple-winding AC rotating machine having a multi-phase winding set in which the phase difference between current in a first winding and current in a second winding is 360/(3×M) degrees ("3×M" refers to the number of salient magnetic poles) is to be controlled, allowing the counter-electromotive force and current phase generated by the first winding to be in phase and also allowing the counter-electromotive force and current phase generated by the second winding to be in phase, which allows the motor to be efficiently driven.

A control apparatus for the AC rotating machine disclosed in the PTL 3 includes: a control means for generating a motor drive command in response to an input command; a PWM inverter circuit for supplying drive voltage to the motor in response to the motor drive command; a master motor control unit having a data communication means for providing a motor drive command to another motor control unit; a slave motor control unit having a data communication means for receiving a motor drive command from the master motor control unit and a PWM inverter circuit for supplying drive voltage to the motor in response to the motor drive command from the master motor control unit; 3×M salient magnetic poles (M is an integer more than one); and the motor in which three-phase master windings and slave windings wound around the salient magnetic poles are configured independently of one another. The master windings of the motor are connected to the master motor control unit, while the slave windings are connected to the slave motor control unit. The master motor control unit has a command distributor that provides motor current fed to the slave windings with a phase difference with respect to motor current fed to the master windings and is configured to drive one motor in response to the motor drive command. The command distributor provides a phase difference of 360/(3×M) degrees between the motor current fed to the master windings and the motor current fed to the slave windings.

CITATION LIST

Patent Literature

PTL 1: JP-A-03-253293
PTL 2: JP-A-2011-152027
PTL 3: JP-A-2011-15587

SUMMARY OF INVENTION

Technical Problem

The control apparatus for AC rotating machine described in the PTL 1 has a problem that, for controlling current of a multiple-winding AC rotating machine, the same number of the three-phase to two-phase conversion means for converting the detected phase current values of the phases into d-axis and q-axis currents and the two-phase to three-phase conversion means for generating a three-phase voltage command value from a two-phase voltage command value as the number of the inverters are included, which causes a problem of putting a high computational load on a microcomputer.

Furthermore, the control apparatus for AC rotating machine described in the PTL 2 has a problem that magnetic coupling between the windings of each set causes interference between the output currents of the inverters, which causes ripple in the output currents particularly when the gain of a current control system is high, preventing highly responsive control.

Furthermore, the control apparatus for AC rotating machine described in the PTL 3 also has a problem that magnetic coupling between the windings of each set causes interference between the output currents of the inverters, which causes ripple in the output currents particularly when the gain of a current control system is high, preventing highly responsive control.

As described above, the conventional control apparatus for AC rotating machine for performing current control of a multiple-winding AC rotating machine having a plurality of multi-phase winding sets cannot achieve at the same time reduction in the number of the three-phase to two-phase conversion means or the two-phase to three-phase conversion means to less than the number of the inverters in order to reduce a computational load on a microcomputer and suppression of interference due to unbalance of current between the windings for causing the current control to be highly responsive.

In order to solve the above problem, it is an object of the present invention to provide a control apparatus for an AC rotating machine having a plurality of multi-phase winding sets that reduces a computational load on a microcomputer while maintaining highly responsive current control, and also provide an electrically-assisted power steering apparatus provided with the control apparatus.

Solution to Problem

A control apparatus for AC rotating machine in accordance with the invention includes: a voltage command calculation means for calculating voltage commands on two rotational axes; a first voltage application means for applying voltages to first windings of a multiple-winding AC rotating machine having at least the first windings and second windings based on the voltage commands on two rotational axes output by the voltage command calculation means; and a second voltage application means for applying voltages to the second windings based on the voltage commands on two rotational axes output by the voltage command calculation means, wherein the second voltage application means applies voltages to the second windings based on the deviations between the currents fed to the first windings and the currents fed to the second windings.

Advantageous Effects of Invention

The control apparatus for AC rotating machine in accordance with the invention is configured such that both the first voltage application means and the second voltage application means are configured to apply voltages to the first windings and the second windings based on the voltage commands on two rotational axes output by the voltage command calculation means, and also configured to apply voltages to the second windings of the AC rotating machine based on the deviations between the currents fed to the first windings and the currents fed to the second windings. So, it is possible to suppress oscillation of the current fed to the first windings and the current fed to the second windings due to mutual inductance while reducing rotating coordinate calculations that intensively use trigonometric function and the like.

The foregoing and other objects, features and advantages of the invention will become more apparent from the following detailed description of the invention when taken in conjunction with the accompanying drawings.

BRIEF DESCRIPTION OF DRAWINGS

FIG. 5 is a table showing phase differences for M=1-5 and voltages and currents having the phase differences in accordance with the third embodiment.

FIG. 7 is a table showing phase differences for N=1-6 and voltages and currents having the phase differences in accordance with the fourth embodiment.

DESCRIPTION OF EMBODIMENTS

Preferred embodiments of a control apparatus for AC rotating machine and an electrically-assisted power steering apparatus provided with the control apparatus in accordance with the invention is described below with reference to the drawings.

First Embodiment

Figure 1:
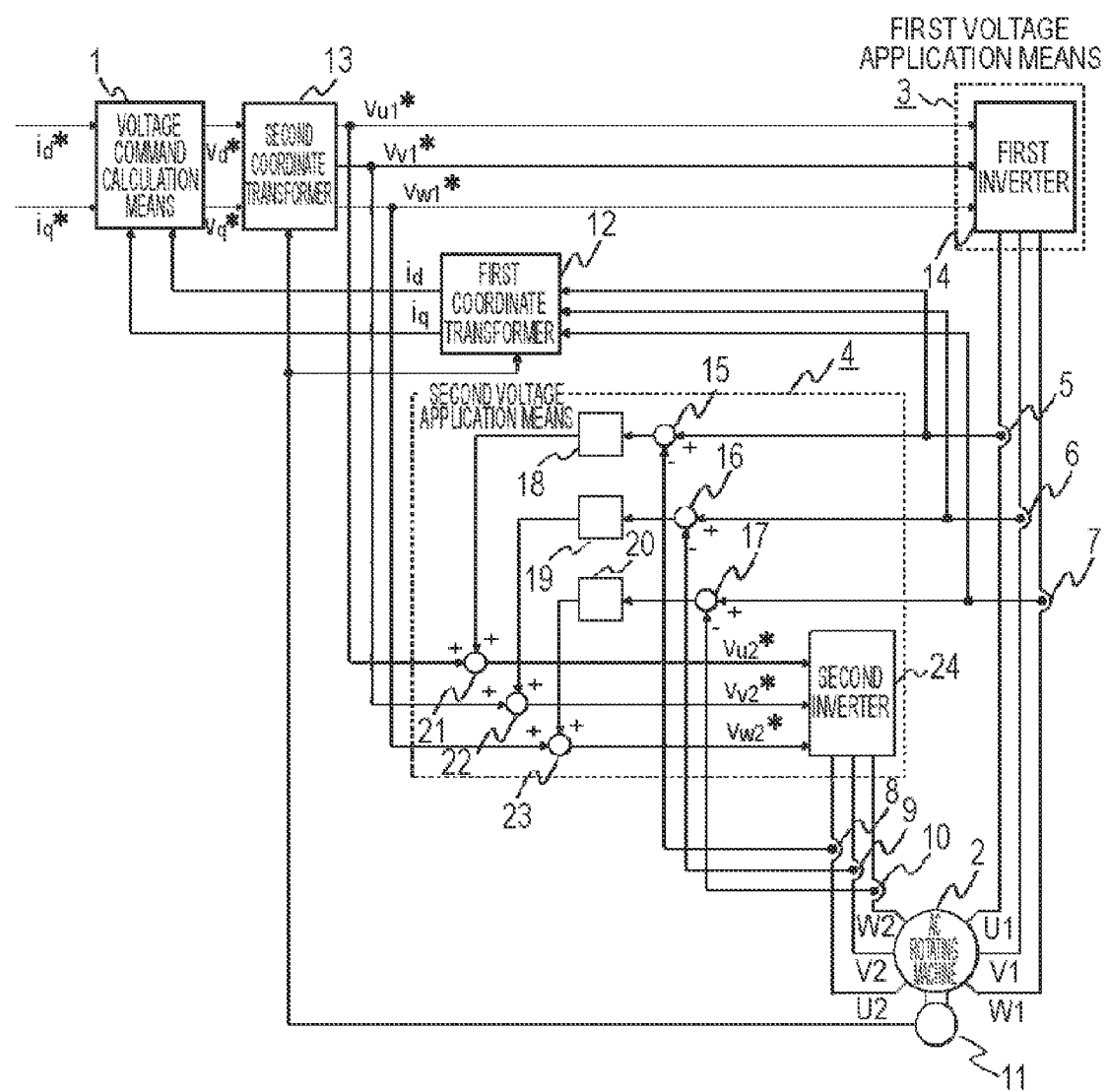
FIG. 1 is a diagram showing an overall configuration of a control apparatus for AC rotating machine in accordance with a first embodiment of the invention.

FIG. 1 shows an overall configuration of a control apparatus for AC rotating machine in accordance with a first embodiment of the invention. In FIG. 1, a voltage command calculation means 1 calculates voltage commands on two rotational axes (d-q axis) vd*, vq*. An AC rotating machine 2 includes multiple windings including first windings U1, V1, W1 and second windings U2, V2, W2. Note that, in this embodiment, a permanent magnet-type synchronous machine including multiple windings is described as the AC rotating machine 2, however the AC rotating machine 2 may be a field winding-type synchronous machine including multiple windings or an induction machine including multiple windings.

A first voltage application means 3 applies voltages to the first windings U1, V1, W1 of the AC rotating machine 2 based on the voltage commands on two rotational axes (d-q axis) vd*, vq* output from the voltage command calculation means 1. A second voltage application means 4 applies voltages to the second windings U2, V2, W2 of the AC rotating machine 2 based on the voltage commands on two rotational axes (d-q axis) vd*, vq* output from the voltage command calculation means 1.

Current detectors 5, 6, 7 detect currents iu1, iv1, iw1 fed to the first windings U1, V1, W1 of the AC rotating machine 2, respectively. Current detectors 8, 9, 10 detect currents iu2, iv2, iw2 fed to the second windings U2, V2, W2 of the AC rotating machine 2, respectively.

A position detector 11 detects the rotation position of the AC rotating machine 2. A first coordinate transformer 12 coordinate transforms the currents iu1, iv1, iw1 fed to the first windings U1, V1, W1 into currents on two rotational axes (d-q axis) id, iq based on the rotation position. A second coordinate transformer 13 coordinate transforms the voltage commands on two rotational axes (d-q axis) vd*, vq* into three-phase AC voltage commands vu1*, vv1*, vw1* based on the rotation position detected by the position detector 11. Thus, the first coordinate transformer 12 and the second coordinate transformer 13 perform coordinate transformation based on the rotation position detected by the position detector 11, which causes the two rotational axes (d-q axis) to be coordinate axes rotating in synchronization with the rotation position of the AC rotating machine 2.

The voltage command calculation means 1 calculates the voltage commands on two rotational axes (d-q axis) vd*, vq* so that the currents on two rotational axes (d-q axis) id, iq correspond with current commands on two rotational axes (d-q axis) id*, iq* to be fed to the AC rotating machine 2. The current commands on two rotational axes (d-q axis) id*, iq* in this embodiment are currents on two rotational axes (d-q axis) to be fed to the first windings U1, V1, W1 and the second windings U2, V2, W2 of the AC rotating machine 2, individually.

The first voltage application means 3 includes a first inverter 14. The first inverter 14 applies three-phase AC voltages based on the three-phase AC voltage commands vu1*, vv1*, vw1* to the first windings U1, V1, W1 of the AC rotating machine 2. On the other hand, the second voltage application means 4 applies voltages to the second windings U2, V2, W2 of the AC rotating machine 2 based on the deviations diu (=iu1−iu2), div (=iv1−iv2), diw (=iw1−iw2) between the currents iu1, iv1, iw1 fed to the first windings U1, V1, W1 of the AC rotating machine 2 and the currents iu2, iv2, iw2 fed to the second windings U2, V2, W2. The second voltage application means 4 includes subtractors 15, 16, 17, amplifiers 18, 19, 20, adders 21, 22, 23 and a second inverter 24.

The subtractor 15 subtracts the current iu2 obtained by the current detector 8 from the current iu1 obtained by the current detector 5 and outputs the deviation diu. Similarly, the subtractor 16 subtracts the current iv2 obtained by the current detector 9 from the current iv1 obtained by the current detector 6 and outputs the deviation div. Similarly, the subtractor 17 subtracts the current iw2 obtained by the current detector 10 from the current iw1 obtained by the current detector 7 and outputs the deviation diw.

The amplifier 18 amplifies the deviation diu and outputs the amplified value. Similarly, the amplifier 19 amplifies the deviation div and outputs the amplified value. Similarly, the amplifier 20 amplifies the deviation diw and outputs the amplified value.

The adder 21 adds the output value of the amplifier 18 to the three-phase AC voltage command vu1* and outputs the added value as a three-phase AC voltage command vu2*. Similarly, the adder 22 adds the output value of the amplifier 19 to the three-phase AC voltage command vv1* and outputs the added value as a three-phase AC voltage command vv2*. Similarly, the adder 23 adds the output value of the amplifier 20 to the three-phase AC voltage command vw1* and outputs the added value as a three-phase AC voltage command vw2*.

The second inverter 24 applies three-phase AC voltages based on the three-phase AC voltage commands vu2*, vv2*, vw2* output from the adders 21, 22, 23 to the second windings U2, V2, W2 of the AC rotating machine 2.

Figure 2:
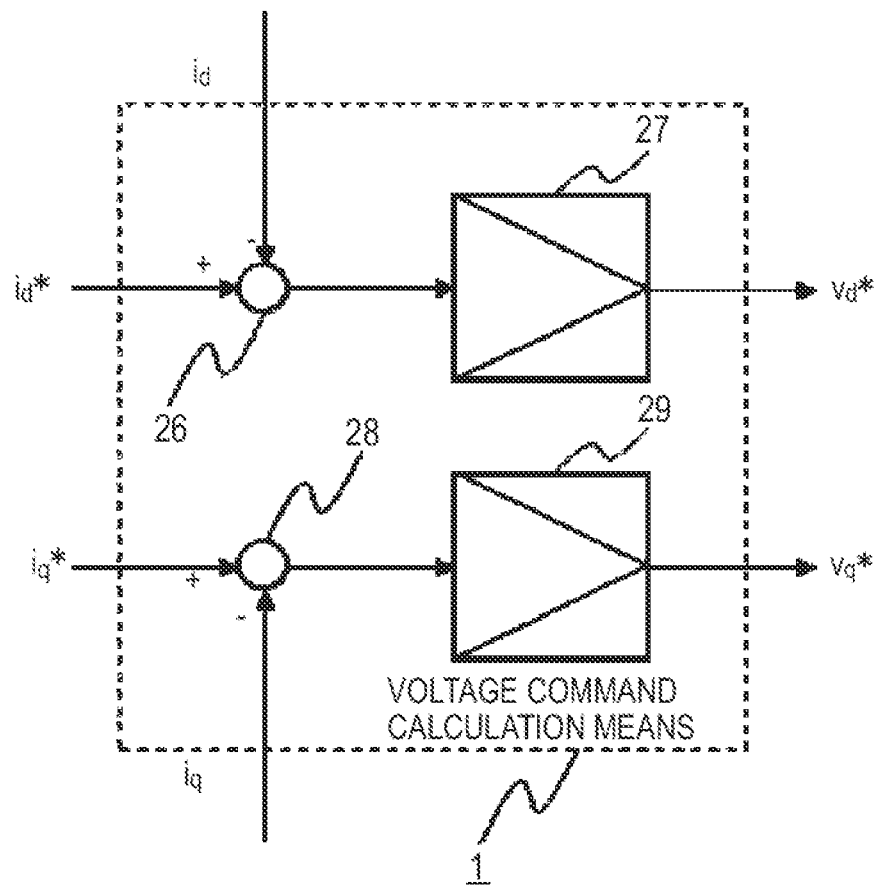
FIG. 2 is a diagram showing an internal configuration of a voltage command calculation means in accordance with the first embodiment of the invention.

FIG. 2 shows the internal configuration of the voltage command calculation means 1. A subtractor 26 subtracts the current on two rotational axes (d-q axis) id from the current command on two rotational axes (d-q axis) id* to be fed to the AC rotating machine 2 and outputs the deviation (id*−id) to an amplifier 27. The amplifier 27 amplifies the deviation (id*−id) and outputs the amplification result as the voltage command on two rotational axes (d-q axis) vd*. Similarly, a subtractor 28 subtracts the current on two rotational axes (d-q axis) iq from the current command on two rotational axes (d-q axis) iq* to be fed to the AC rotating machine 2 and outputs the deviation (iq*−iq) to an amplifier 29. The amplifier 29 amplifies the deviation (iq*−iq) and outputs the amplification result as the voltage command on two rotational axes (d-q axis) vq*. Note that the amplifiers 27 and 29 each perform amplification using proportional-integral calculation.

Next, the current control in this embodiment is described with reference to FIGS. 1 and 2. The voltage command calculation means 1 calculates the voltage commands on two rotational axes (d-q axis) vd*, vq* so that the currents on two rotational axes (d-q axis) fed to the first windings U1, V1, W1 of the AC rotating machine 2 correspond with the current commands on two rotational axes (d-q axis). The first voltage application means 3 applies three-phase AC voltages based on the voltage commands vd*, vq* to the first windings U1, V1, W1 of the AC rotating machine 2. This series of feedback control allows the currents on two rotational axes (d-q axis) fed to the first windings U1, V1, W1 to correspond with the current commands on two rotational axes (d-q axis).

On the other hand, the second voltage application means 4 is configured to apply three-phase AC voltages to the second windings U2, V2, W2 of the AC rotating machine 2 based on the three-phase AC voltage commands vu1*, vv1*, vw1* shared with the first voltage application means 3, and also feed back the values based on the deviations between the currents fed to the first windings U1, V1, W1 and the currents fed to the second windings U2, V2, W2 by the adders 21, 22, 23. If the impedances of the first windings U1, V1, W1 are absolutely equal to those of the second windings U2, V2, W2 and the three-phase AC voltages applied by the first inverter 14 are absolutely equal to those applied by the second inverter 24, no deviation occurs between the currents fed to the first windings U1, V1, W1 and the currents fed to the second windings U2, V2, W2, so the feedback by the adders 21, 22, 23 is not necessary. However, actually, due to a variation or the like, it never happens that the impedances of the first windings U1, V1, W1 are absolutely equal to those of the second windings U2, V2, W2 or the three-phase AC voltages applied by the first inverter 14 are absolutely equal to those applied by the second inverter 24.

In this embodiment, the second voltage application means 4 is configured to calculate the current deviations for each of the phases between the currents fed to the first windings U1, V1, W1 of the AC rotating machine 2 and the currents fed to the second windings U2, V2, W2 and apply voltages to the second windings U2, V2, W2 of the AC rotating machine 2 based on the values obtained by feeding back the current deviations for each of the phases to the values obtained by coordinate transforming the voltage commands on two rotational axes obtained from the voltage command calculation means 1 into the voltage commands of the phases. So, even when, due to a variation or the like, the impedances of the first windings U1, V1, W1 are not absolutely equal to those of the second windings U2, V2, W2 or the three-phase AC voltages applied by the first inverter 14 are not absolutely equal to those applied by the second inverter 24, it is possible to suppress interference due to unbalance of current between the windings to cause the current control to be highly responsive.

In order to drive a multiple-winding AC rotating machine having first windings and second windings, the conventional control apparatus for AC rotating machine described in the PTL 1 is configured to include a voltage command calculation means for calculating voltage commands on two rotational axes for each windings, so rotating coordinate calculations also need to be performed for each windings. This intensively uses trigonometric function and the like that put a high computational load on a microcomputer, which causes a problem of putting a high computational load on a microcomputer.

On the other hand, in this embodiment, both the first voltage application means 3 and the second voltage application means 4 are configured to apply voltages to the windings based on the voltage commands on two rotational axes calculated by the voltage command calculation means 1. So, it is possible to reduce rotating coordinate calculations that intensively use trigonometric function and the like, which provides an effect of reducing the computational load on a microcomputer.

Furthermore, the conventional control apparatus for AC rotating machine described in the PTL 2 does not perform control based on the deviations between currents fed to the first windings and currents fed to the second windings, so, when a variation or the like occurs, magnetic coupling between the windings of each set causes interference between the currents fed by the inverters. This causes ripple in the output currents due to the interference particularly when the gain of a current control system is high, which may cause a problem of preventing highly responsive control.

On the other hand, in this embodiment, the second voltage application means 4 is configured to apply voltages to the second windings U2, V2, W2 based on the deviations between the currents fed to the first windings U1, V1, W1 of the AC rotating machine 2 and the currents fed to the second windings U2, V2, W2. So, the second voltage application means 4 operates so that the currents fed to the second windings U2, V2, W2 correspond with the currents fed to the first windings U1, V1, W1, which can suppress interference between the currents fed by the inverters 14, 24 due to magnetic coupling between the windings of each set. This can provide an effect of maintaining highly responsive current control even with a multiple-winding AC rotating machine.

Second Embodiment

Next, a control apparatus for AC rotating machine in accordance with a second embodiment of the invention is described. In the control apparatus for AC rotating machine described in the first embodiment, the first coordinate transformer 12, based on the rotation position detected by the position detector 11, coordinate transforms the currents iu1, iv1, iw1 fed to the first windings U1, V1, W1 into the current on two rotational axes (d-q axis) id, iq, and the voltage command calculation means 1 calculates the voltage commands on two rotational axes (d-q axis) vd*, vq* so that the currents on two rotational axes (d-q axis) id, iq correspond with the current commands on two rotational axes (d-q axis) id*, iq* to be fed to the AC rotating machine 2. However, the sums of the currents iu1, iv1, iw1 fed to the first windings U1, V1, W1 and the currents iu2, iv2, iw2 fed to the second windings U2, V2, W2 may also be coordinate transformed into the currents on two rotational axes (d-q axis) id, iq.

Figure 3:
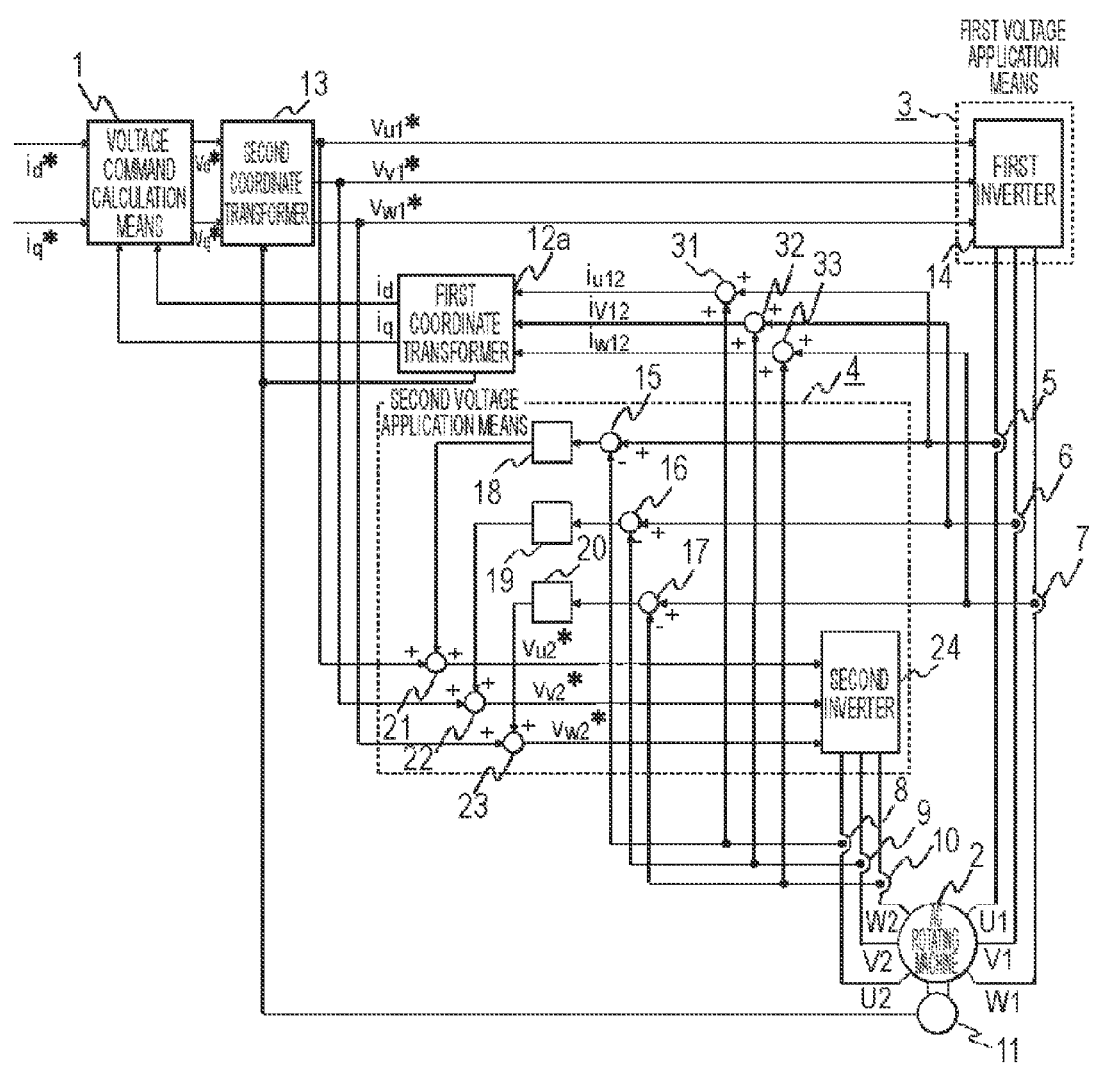
FIG. 3 is a diagram showing an overall configuration of a control apparatus for AC rotating machine in accordance with a second embodiment of the invention.

FIG. 3 shows a configuration of a control apparatus for AC rotating machine in accordance with a second embodiment. Reference numerals also used in the first embodiment denote parts the same as or corresponding to those in the first embodiment, which are not described here.

In FIG. 3, an adder 31 adds the current iu2 obtained from the current detector 8 to the current iu1 obtained from the current detector 5 and outputs the added value iu12. Similarly, an adder 32 adds the current iv2 obtained from the current detector 9 to the current iv1 obtained from the current detector 6 and outputs the added value iv12. Similarly, an adder 33 adds the current iw2 obtained from the current detector 10 to the current iw1 obtained from the current detector 7 and outputs the added value iw12.

A first coordinate transformer 12a, based on the rotation position detected by the position detector 11, coordinate transforms currents iu12, iv12, iw12 obtained from the adders 31, 32, 33 into the current on two rotational axes (d-q axis) id, iq, and the voltage command calculation means 1 calculates the voltage commands on two rotational axes (d-q axis) vd*, vq* so that the currents on two rotational axes (d-q axis) id, iq correspond with the current commands on two rotational axes (d-q axis) id*, iq* to be fed to the AC rotating machine 2. Here, the current commands on two rotational axes (d-q axis) id*, iq* in the second embodiment are currents on two rotational axes (d-q axis) to be fed to the first windings U1, V1, W1 and the second windings U2, V2, W2 of the AC rotating machine 2 in combination.

Even when the control apparatus for AC rotating machine is configured as shown in FIG. 3, similarly to the control apparatus for AC rotating machine described in the first embodiment, both the first voltage application means 3 and the second voltage application means 4 are configured to apply voltages to the windings based on the voltage commands on two rotational axes calculated by the voltage command calculation means 1. So, it is possible to reduce rotating coordinate calculations that intensively use trigonometric function and the like, which provides an effect of reducing a computational load on a microcomputer.

Furthermore, similarly to the control apparatus for AC rotating machine described in the first embodiment, the second voltage application means 4 is configured to apply voltages to the second windings U2, V2, W2 of the AC rotating machine 2 based on the deviations between the currents fed to the first windings U1, V1, W1 and the currents fed to the second windings U2, V2, W2. So, the second voltage application means 4 operates so that the currents fed to the second windings U2, V2, W2 correspond with the currents fed to the first windings U1, V1, W1, which can suppress interference between the currents fed by the inverters 14, 24 due to magnetic coupling between the windings of each set. This can provide an effect of maintaining highly responsive current control even with a multiple-winding AC rotating machine.

Third Embodiment

Figure 4:
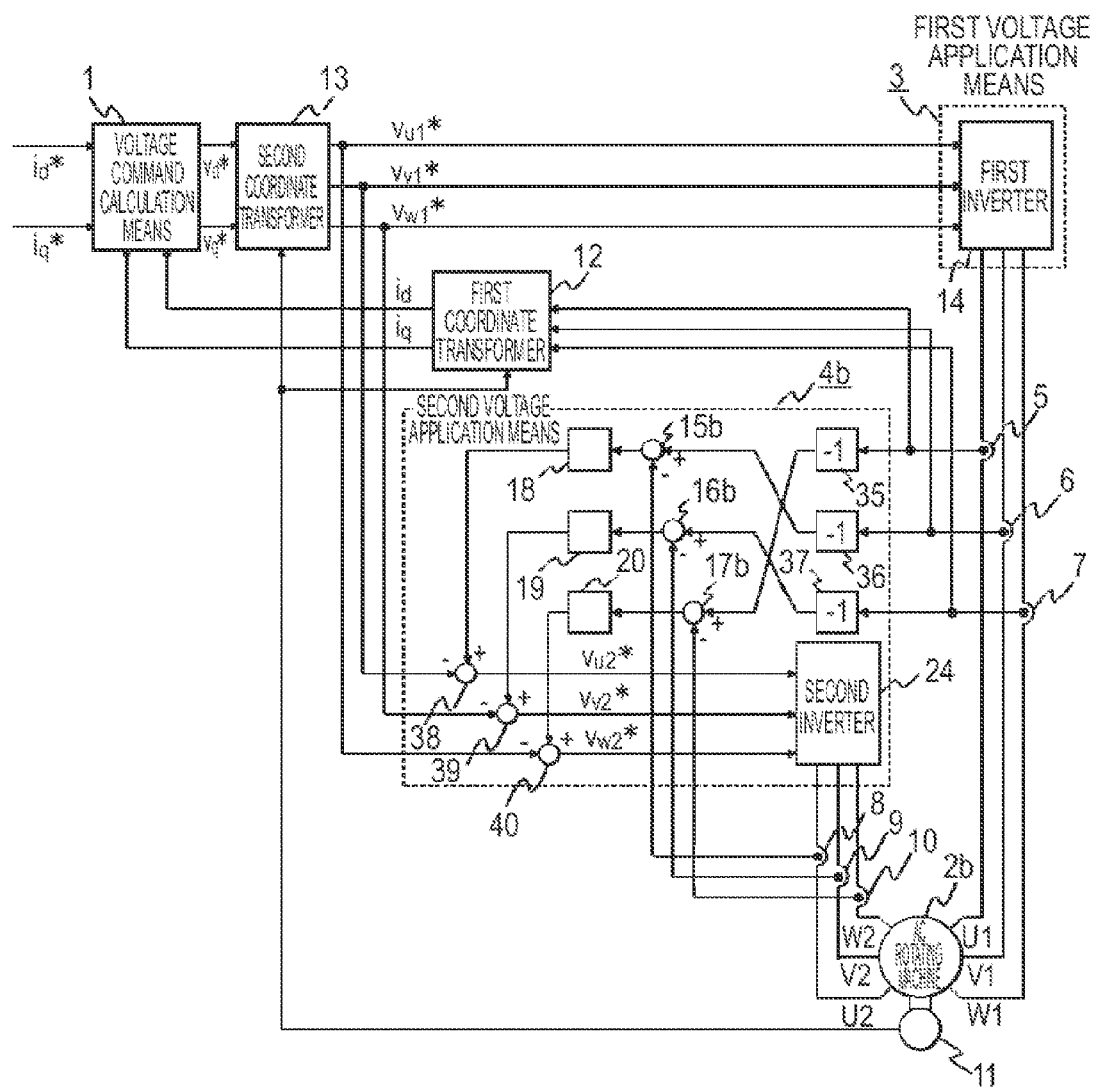
FIG. 4 is a diagram showing an overall configuration of a control apparatus for AC rotating machine in accordance with a third embodiment of the invention.

Next, a control apparatus for AC rotating machine in accordance with a third embodiment of the invention is described. The AC rotating machine 2 described in the first or second embodiment includes the first windings U1, V1, W1 and the second windings U2, V2, W2 in which U1 and U2 are in phase, V1 and V2 are in phase, and W1 and W2 are in phase. On the other hand, in the third embodiment, an AC rotating machine is described in which U1 and U2 are not in phase, V1 and V2 are not in phase, and W1 and W2 are not in phase. FIG. 4 shows a configuration of a control apparatus for AC rotating machine in accordance with the third embodiment. Reference numerals also used in the first or second embodiment denote parts the same as or corresponding to those in the first or second embodiment, which are not described here.

In FIG. 4, an AC rotating machine 2b includes the first windings U1, V1, W1 and the second windings U2, V2, W2 in which a phase difference of 60 degrees exists between U1 and U2. Similarly, a phase difference of 60 degrees also exists between V1 and V2 and between W1 and W2. Now, noting the currents iu1, iv1, iw1 fed to the first windings U1, V1, W1, a phase difference of 60 degrees exists between iu1 and −iv1. Similarly, a phase difference of 60 degrees also exists between iv1 and −iw1 and between iw1 and −iu1.

As such, a second voltage application means 4b uses the deviations between the currents iu1, iv1, iw1 fed to the first windings U1, V1, W1 of the AC rotating machine 2b and the currents iu2, iv2, iw2 fed to the second windings U2, V2, W2 in a combination different from that in the first or second embodiment. Specifically, the second voltage application means 4b applies voltages to the second windings U2, V2, W2 of the AC rotating machine 2b based on the deviations diu (=−iv1−iu2), div (=−iw1−iv2), diw (=−iu1−iw2) between −iv1, −iw1, −iu1 having a phase difference of 60 degrees with respect to the currents iu1, iv1, iw1 fed to the first windings U1, V1, W1 and the currents iu2, iv2, iw2 fed to the second windings U2, V2, W2.

The second voltage application means 4b includes sign inverters 35, 36, 37, subtractors 15b, 16b, 17b, amplifiers 18, 19, 20, subtractors 38, 39, 40 and the second inverter 24. The sign inverter 35 inverts the sign of the current iu1 fed to the first winding U1 and outputs −iu1. Similarly, the sign inverter 36 inverts the sign of the current iv1 fed to the first winding V1 and outputs −iv1. Similarly, the sign inverter 37 inverts the sign of the current iw1 fed to the first winding W1 and outputs −iw1.

The subtractor 15b subtracts the current iu2 obtained by the current detector 8 from the current iv1 obtained by the sign inverter 36 and outputs the deviation diu. Similarly, the subtractor 16b subtracts the current iv2 obtained by the current detector 9 from the current iw1 obtained by the sign inverter 37 and outputs the deviation div. Similarly, the subtractor 17b subtracts the current iw2 obtained by the current detector 10 from the current iu1 obtained by the sign inverter 35 and outputs the deviation diw.

Also as to the voltages, as with the currents, noting the three-phase AC voltage commands vu1*, vv1*, vw1* to be applied to the first windings U1, V1, W1, a phase difference of 60 degrees exists between vu1* and −vv1*. Similarly, a phase difference of 60 degrees also exists between vv1* and −vw1* and between vw1* and −vu1*. As such the combination for calculating the three-phase AC voltage commands vu2*, vv2*, vw2* based on the three-phase AC voltage commands vu1*, vv1*, vw1* is changed from the first or second embodiment.

The subtractor 38 subtracts the three-phase AC voltage command vv1* from the output value of the amplifier 18 and outputs the subtracted value as a three-phase AC voltage command vu2*. Similarly, the subtractor 39 subtracts the three-phase AC voltage command vw1* from the output value of the amplifier 19 and outputs the subtracted value as a three-phase AC voltage command vv2*. Similarly, the subtractor 40 subtracts the three-phase AC voltage command vu1* from the output value of the amplifier 20 and outputs the subtracted value as a three-phase AC voltage command vw2*. The second inverter 24 applies three-phase AC voltages based on the three-phase AC voltage commands vu2*, vv2*, vw2* output from the subtractors 38, 39, 40 to the second windings U2, V2, W2 of the AC rotating machine 2b.

Thus, the subtractors 15b, 16b, 17b are configured such that the combination of currents subject to subtraction is different from that of the first or second embodiment, and the subtractors 38, 39, 40 are configured such that the combination of voltages subject to addition and subtraction is also different from that of the first or second embodiment.

In the third embodiment, the AC rotating machine 2b having a phase difference of 60 degrees between the first windings U1, V1, W1 and the second windings U2, V2, W2 is described. However, with an integer M, the same applies to an AC rotating machine having a phase difference of (60×M) degrees.

FIG. 5 is a table showing phase differences for M=1-5 and voltages and currents having the phase differences. For example, for M=4, the current having a phase difference of 240 degrees with respect to the V-phase current iv1 is iw1, so the V-phase deviation div may be obtained by subtracting iv2 from iw1. Thus, it is obvious that the relation shown in FIG. 5 obviously applies to an AC rotating machine having a phase difference of (60×M) degrees with an integer M.

As described above, the second voltage application means 4b is configured such that, in order to apply voltages to the second windings U2, V2, W2 of the AC rotating machine 2b based on the voltage commands on two rotational axes output from the voltage command calculation means 1, the combination of the three-phase AC voltage commands vu1*, vv1*, vw1* to be applied to the first windings U1, V1, W1 is changed from that of the first or second embodiment, and the deviations between the currents iu1, iv1, iw1 fed to the first windings U1, V1, W1 and the currents iu2, iv2, iw2 fed to the second windings U2, V2, W2 are changed from the combination in the first or second embodiment, which allows the AC rotating machine 2b including the first windings U1, V1, W1 and the second windings U2, V2, W2 and having a phase difference of 60 degrees between the first windings U1, V1, W1 and the second windings U2, V2, W2 to be driven.

Similarly to the control apparatus for AC rotating machine in accordance with the first or second embodiment, in the control apparatus for AC rotating machine in accordance with the third embodiment, both the first voltage application means 3 and the second voltage application means 4 are configured to apply voltages to the windings based on the voltage commands on two rotational axes calculated by the voltage command calculation means 1. So, it is possible to reduce rotating coordinate calculations that intensively use trigonometric function and the like, which provides an effect of reducing a computational load on a microcomputer.

Furthermore, the conventional control apparatus for AC rotating machine described in the PTL 3 that controls a multiple-winding AC rotating machine having a phase difference between currents in the first windings U1, V1, W1 and currents in the second windings U2, V2, W2 has a problem that magnetic coupling between the windings of each set causes interference between the output currents of the inverters, which causes ripple in the output currents particularly when the gain of a current control system is high, preventing highly responsive control. On the other hand, the control apparatus for AC rotating machine in accordance with the third embodiment controls the multiple-winding AC rotating machine having the phase difference, in which the second voltage application means 4b is configured to apply voltages to the second windings U2, V2, W2 of the AC rotating machine 2b based on the deviations between the currents fed to the first windings U1, V1, W1 and the currents fed to the second windings U2, V2, W2. So, the second voltage application means 4b operates so that the currents fed to the second windings U2, V2, W2 correspond with the currents fed to the first windings U1, V1, W1, which can suppress interference between the currents fed by the inverters 14, 24 due to magnetic coupling between the windings of each set. This can provide an effect of maintaining highly responsive current control even with a multiple-winding AC rotating machine having the phase difference.

Furthermore, the second voltage application means 4b is configured to apply voltages with a predetermined phase difference with respect to the phase voltages applied by the first voltage application means 3, and also feed back the values obtained by subtracting the currents fed to the second windings U2, V2, W2 of the AC rotating machine 2b from the currents having the predetermined phase difference with respect to the currents fed to the first windings U1, V1, W1 by the subtractor 38, 39, 40 for each of the phases, which provides an effect that even the AC rotating machine 2b having a phase difference of (60×M) degrees can be controlled.

Fourth Embodiment

Next, a control apparatus for AC rotating machine in accordance with a fourth embodiment of the invention is described. The control apparatus for AC rotating machine described in the third embodiment controls the AC rotating machine 2b in which a phase difference of 60 degrees exists between U1 and U2, between V1 and V2, and between W1 and W2. On the other hand, the control apparatus for AC rotating machine in accordance with the fourth embodiment controls an AC rotating machine 2c in which a phase difference of 30 degrees exists between U1 and U2, between V1 and V2, and between W1 and W2. For a multiple-winding AC rotating machine having such a phase difference, ripple can be reduced and the efficiency can be increased.

Figure 6:
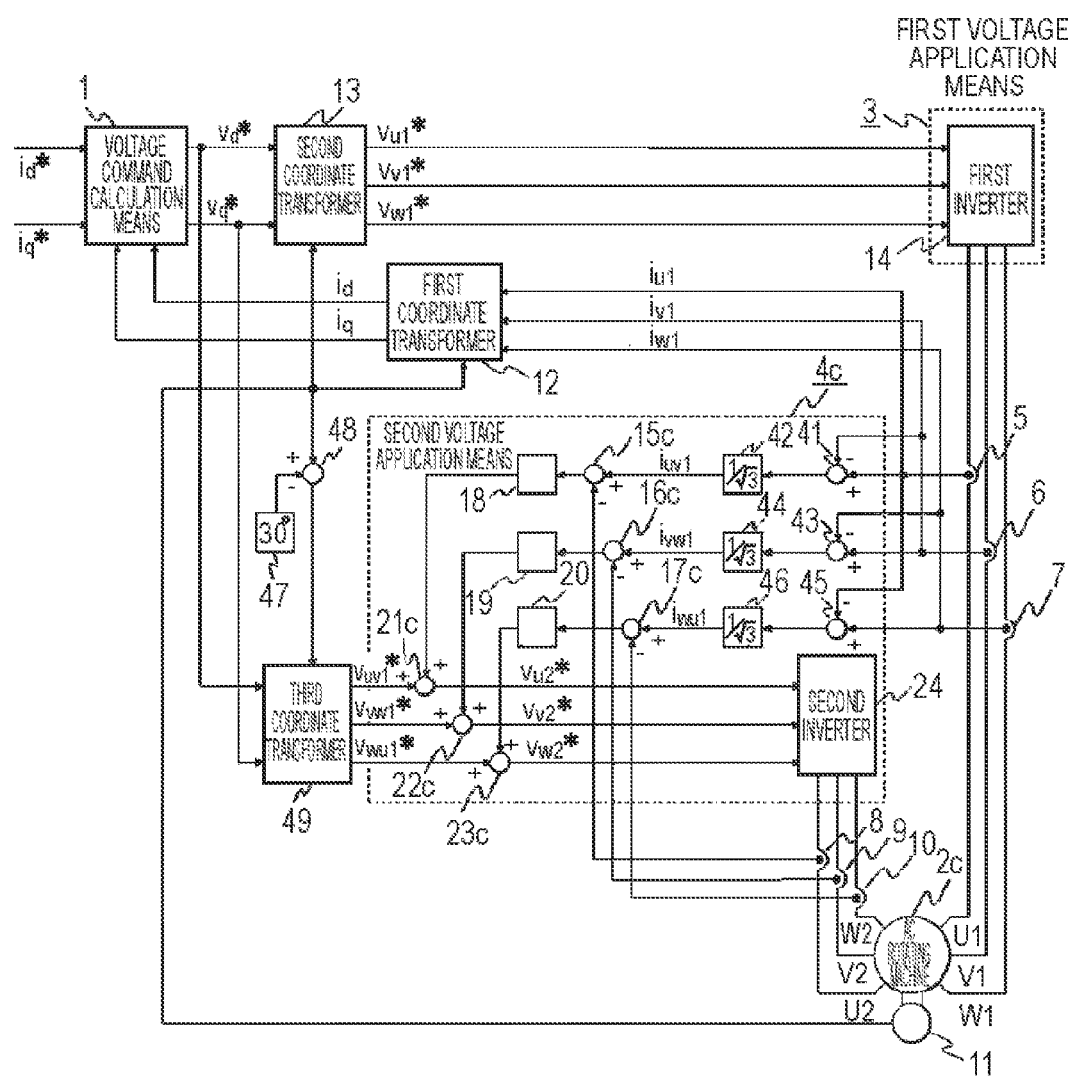
FIG. 6 is a diagram showing an overall configuration of a control apparatus for AC rotating machine in accordance with a fourth embodiment of the invention.

FIG. 6 shows a configuration of a control apparatus for AC rotating machine in accordance with the fourth embodiment. Reference numerals also used in any of the first to third embodiments denote parts the same as or corresponding to those in any of the first to third embodiments, which are not described here.

In FIG. 6, the AC rotating machine 2c includes the first windings U1, V1, W1 and the second windings U2, V2, W2 in which a phase difference of 30 degrees exists between U1 and U2. Similarly, a phase difference of 30 degrees also exists between V1 and V2 and between W1 and W2. Now, noting the currents iu1, iv1, iw1 fed to the first windings U1, V1, W1, a phase difference of 30 degrees exists between iu1 and (iu1−iv1), and (iu1−iv1) has an amplitude $\sqrt{3}$ times larger than that of iu1. Similarly, a phase difference of 30 degrees exists between iv1 and (iv1−iw1), and (iv1−iw1) has an amplitude $\sqrt{3}$ times larger than that of iv1. Similarly, a phase difference of 30 degrees exists between iw1 and (iw1−iu1), and (iw1−iu1) has an amplitude $\sqrt{3}$ times larger than that of iw1.

As such, a second voltage application means 4c uses the deviations between the currents iu1, iv1, iw1 fed to the first windings U1, V1, W1 of the AC rotating machine 2b and the currents iu2, iv2, iw2 fed to the second windings U2, V2, W2 in a combination different from that in any of the first to third embodiments. Specifically, the second voltage application means 4c applies voltages to the second windings U2, V2, W2 of the AC rotating machine 2c based on the deviations diu[= (iu1−iv1)/$\sqrt{3}$−iu2], div[=(iv1−iw1)/$\sqrt{3}$−iv2], diw[−(iw1−iu1)/$\sqrt{3}$−iw2] between (iu1−iv1), (iv1−iw1), (iw1−iu1) having a phase difference of 30 degrees with respect to and the same amplitude as the currents iu1, iv1, iw1 fed to the first windings U1, V1, W1 and the currents iu2, iv2, iw2 fed to the second windings U2, V2, W2.

A subtractor 41 included in the second voltage application means 4c subtracts the current iv1 fed to the first winding V1 from the current iu1 fed to the first winding U1 and outputs (iu1−iv1). A gain multiplier 42 multiplies the output of the subtractor 41 by 1/$\sqrt{3}$ and outputs [(iu1−iv1)/$\sqrt{3}$]. A subtractor 15c subtracts the current iu2 obtained by the current detector 8 from the current [(iu1−iv1)/$\sqrt{3}$] obtained by the gain multiplier 42 and outputs the deviation diu.

Similarly, a subtractor 43 subtracts the current iw1 fed to the first winding W1 from the current iv1 fed to the first winding V1 and outputs (iv1−iw1). A gain multiplier 44 multiplies the output of the subtractor 43 by 1/$\sqrt{3}$ and outputs [(iv1−iw1)/$\sqrt{3}$]. A subtractor 16c subtracts the current iv2 obtained by the current detector 9 from the current [(iv1−iw1)/$\sqrt{3}$] obtained by the gain multiplier 44 and outputs the deviation div.

Similarly, a subtractor 45 subtracts the current iu1 fed to the first winding U1 from the current iw1 fed to the first winding W1 and outputs (iw1−iu1). A gain multiplier 46 multiplies the output of the subtractor 45 by 1/$\sqrt{3}$ and outputs [(iw1−iu1)/$\sqrt{3}$]. A subtractor 17c subtracts the current iw2 obtained by the current detector 10 from the current [(iw1−iu1)/$\sqrt{3}$] obtained by the gain multiplier 46 and outputs the deviation diw.

Also as to the voltages, as with the currents, the way of calculation is changed from the first to third embodiments so that a phase difference of 30 degrees exists. A constant setter 47 outputs a prestored angle. Specifically, the constant setter 47 outputs 30 degrees. A subtractor 48 subtracts 30 degrees output from the constant setter 47 from the rotation position obtained by the position detector 11. A third coordinate transformer 49 coordinate transforms the voltage commands on two rotational axes (d-q axis) vd*, vq* into three-phase AC voltage commands vuv1*, vvw1*, vwu1* based on the rotation position output from the subtractor 48.

An adder 21c adds the output value of the amplifier 18 to the three-phase AC voltage command vuv1* and outputs the added value as a three-phase AC voltage command vu2*, Similarly, an adder 22c adds the output value of the amplifier 19 to the three-phase AC voltage command vvw1* and outputs the added value as a three-phase AC voltage command vv2*. Similarly, an adder 23c adds the output value of the amplifier 20 to the three-phase AC voltage command vwu1* and outputs the added value as a three-phase AC voltage command vw2*. The second inverter 24 applies three-phase AC voltages based on the three-phase AC voltage commands vu2*, vv2*, vw2* output from the adders 21c, 22c, 23c to the second windings U2, V2, W2 of the AC rotating machine 2c.

As described above, the subtractors 15c, 16c, 17c in accordance with the fourth embodiment are configured such that the combination of currents subject to subtraction is different from that of any of the first to third embodiments, and the adders 21c, 22c, 23c are configured such that the phase of voltages subject to addition is different from that of the three-phase AC voltage commands vu1*, vv1*, vw1*. Thus, the second voltage application means 4c is configured such that currents having an electrical phase difference of 30 degrees with respect to the currents fed to the first windings U1, V1, W1 of the AC rotating machine 2c are calculated from the deviations among the phases of the currents fed to the first windings U1, V1, W1, and then the values obtained by subtracting the currents fed to the second windings U2, V2, W2 from the currents having a phase difference of 30 degrees are fed back to the voltages having an electrical phase difference of 30 degrees with respect to the phase voltages applied by the first voltage application means 3 for each of the phases, which allows the AC rotating machine 2c having a phase difference of 30 degrees between the first windings U1, V1, W1 and the second windings U2, V2, W2 to be driven.

In the fourth embodiment, the AC rotating machine 2c having a phase difference of 30 degrees between the first windings U1, V1, W1 and the second windings U2, V2, W2 is described. However, with an integer N, the same applies to an AC rotating machine having a phase difference of (30+60×N) degrees.

FIG. 7 is a table showing phase differences for N=1-6 and voltages and currents having the phase differences. For example, for N=4, the current having the same amplitude as and a phase difference of 210 degrees with respect to the V-phase current iv1 is (iw1−iv1)/√3, so the V-phase deviation div may be obtained by subtracting iv2 from (iw1−iv1)/√3. Thus, it is obvious that the relation shown in FIG. 7 obviously applies to an AC rotating machine having a phase difference of (30+60×N) degrees with an integer N.

The deviations between the currents iu1, iv1, iw1 fed to the first windings U1, V1, W1 and the currents iu2, iv2, iw2 fed to the second windings U2, V2, W2 are changed from the combination in any of the first to third embodiments, which allows the AC rotating machine 2c including the first windings U1, V1, W1 and the second windings U2, V2, W2 and having a phase difference of 30 degrees between the first windings U1, V1, W1 and the second windings U2, V2, W2 to be driven.

Similarly to the control apparatus for AC rotating machine described in the first to third embodiments, in the control apparatus for AC rotating machine in accordance with the fourth embodiment, both the first voltage application means 3 and the second voltage application means 4c are configured to apply voltages to the windings based on the voltage commands on two rotational axes calculated by the voltage command calculation means 1. So, it is possible to reduce rotating coordinate calculations that intensively use trigonometric function and the like, which provides an effect of reducing a computational load on a microcomputer.

Furthermore, similarly to the control apparatus for AC rotating machine described in the first to third embodiments, the second voltage application means 4c is configured to apply voltages to the second windings U2, V2, W2 of the AC rotating machine 2c based on the deviations between the currents fed to the first windings U1, V1, W1 and the currents fed to the second windings U2, V2, W2. So, the second voltage application means 4c operates so that the currents fed to the second windings U2, V2, W2 correspond with the currents fed to the first windings U1, V1, W1, which can suppress interference between the currents fed by the inverters 14, 24 due to magnetic coupling between the windings of each set. This can provide an effect of maintaining highly responsive current control even with a multiple-winding AC rotating machine.

Furthermore, with any positive number N, the second voltage application means 4c is configured such that currents having an electrical phase difference of (30+60×N) degrees with respect to the currents fed to the first windings U1, V1, W1 are calculated from the deviations among the phases of the currents fed to the first windings U1, V1, W1, and then the values obtained by subtracting the currents fed to the second windings U2, V2, W2 from the currents having a phase difference of (30+60×N) degrees are fed back to the voltages having an electrical phase difference of (30+60×N) degrees with respect to the phase voltages applied by the first voltage application means 3 for each of the phases, which provides an effect that the multiple-winding AC rotating machine having a phase difference of (30+60×N) degrees between the first windings U1, V1, W1 and the second windings U2, V2, W2 can be driven.

Fifth Embodiment

Next, a control apparatus for AC rotating machine in accordance with a fifth embodiment of the invention is described. In the fourth embodiment, the calculation for providing a phase difference of 30 degrees to the voltages is described such that the constant setter 47, the subtractor 48 and the third coordinate transformer 49 are provided, and the voltage commands on two rotational axes (d-q axis) vd*, vq* are coordinate transformed into the three-phase AC voltage commands vuv1*, vvw1*, vwu1*. Here, using phase differences for N=1 to 6 shown in FIG. 7 and voltages having the phase differences can eliminate the need for the constant setter 47, the subtractor 48 and the third coordinate transformer 49, which can further reduce rotating coordinate calculations that intensively use trigonometric function and the like.

For example, for N=1, the voltage having the same amplitude as and a phase difference of 30 degrees with respect to the U-phase voltage command vu1* is (vu1*−vv1*)/√3, so the three-phase AC voltage command vuv1* may be substituted by (vu1*−vv1*)/√3. Similarly, the voltage having the same amplitude as and a phase difference of 30 degrees with respect to the V-phase voltage command vv1* is (vv1*−vw1*)/√3, so the three-phase AC voltage command vvw1* may be substituted by (vv1*−vw1*)/√3. Similarly, the voltage having the same amplitude as and a phase difference of 30 degrees with respect to the W-phase voltage command vw1* is (vw1*−vu1*)/√3, so the three-phase AC voltage command vwu1* may be substituted by (vw1*−vu1*)/√3.

Figure 8:
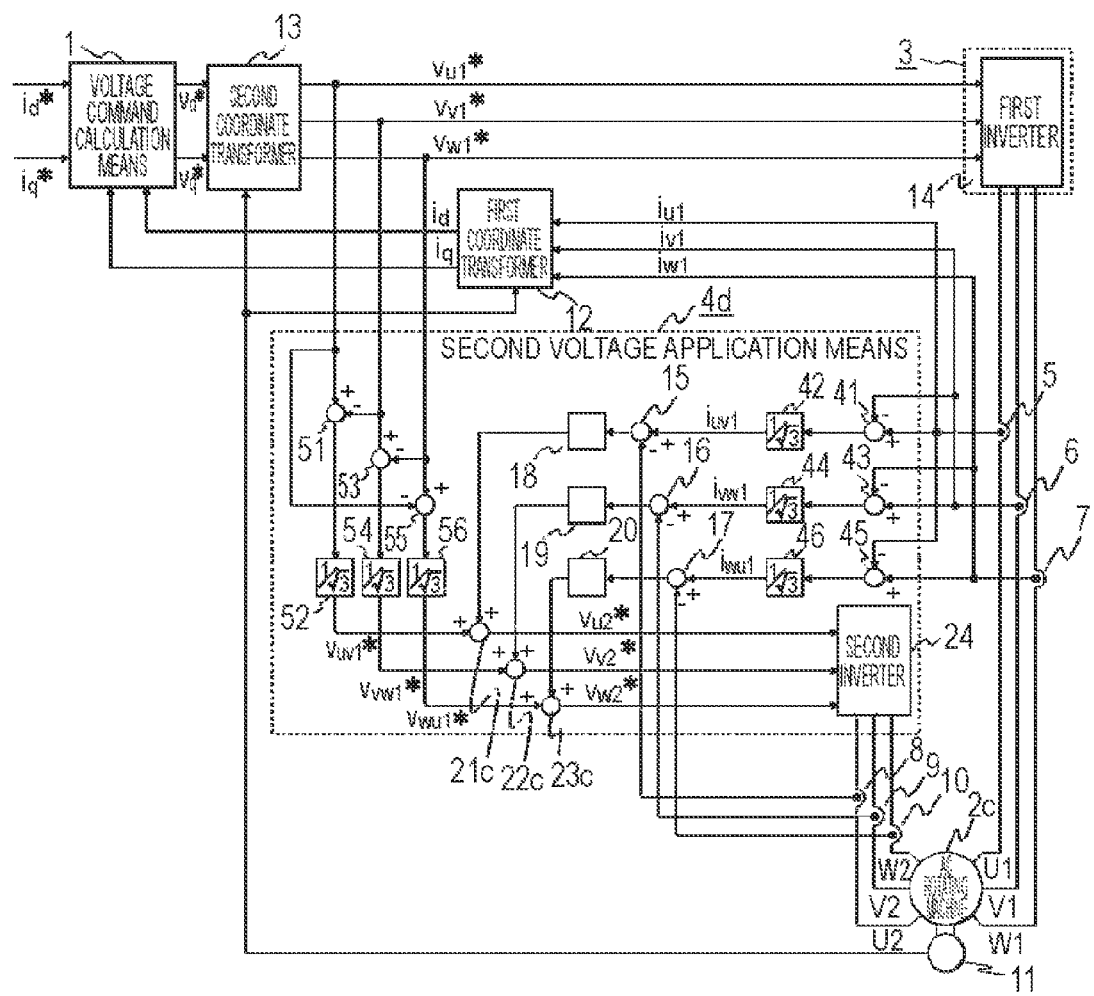
FIG. 8 is a diagram showing an overall configuration of a control apparatus for AC rotating machine in accordance with a fifth embodiment of the invention.

FIG. 8 shows a configuration of a control apparatus for AC rotating machine in accordance with the fifth embodiment. Reference numerals also used in any of the first to fourth embodiments denote parts the same as or corresponding to those in any of the first to fourth embodiments, which are not described here.

In FIG. 8, a second voltage application means 4d calculates from the three-phase AC voltage commands vu1*, vv1*, vw1* the three-phase AC voltage commands vuv1*, vvw1*, vwu1* having a phase difference of 30 degrees with respect to the three-phase AC voltage commands vu1*, vv1*, vw1*.

A subtractor 51 subtracts vv1* from vu1* and outputs (vu1*−vv1*). A gain multiplier 52 multiplies (vu1*−vv1*) output from the subtractor 51 by 1/√3 and outputs the result, i.e., (vu1*−vv1*)/√3. The output of the gain multiplier 52 has the same amplitude as and a phase difference of 30 degrees with respect to vu1* that is equal to the three-phase AC voltage command vuv1* described in the fourth embodiment.

Similarly, a subtractor 53 subtracts vw1* from vv1* and outputs (vv1*−vw1*). A gain multiplier 54 multiplies (vv1*−vw1*) output from the subtractor 53 by $1/\sqrt{3}$ and outputs the result, i.e., (vv1*−vw1*)$/\sqrt{3}$. The output of the gain multiplier 54 has the same amplitude as and a phase difference of 30 degrees with respect to vv1* that is equal to the three-phase AC voltage command vvw1* described in the fourth embodiment.

Similarly, a subtractor 55 subtracts vu1* from vw1* and outputs (vw1*−vu1*). A gain multiplier 56 multiplies (vw1*−vu1*) output from the subtractor 55 by $1/\sqrt{3}$ and outputs the result, i.e., (vw1*−vu1*)$/\sqrt{3}$. The output of the gain multiplier 56 has the same amplitude as and a phase difference of 30 degrees with respect to vw1* that is equal to the three-phase AC voltage command vwu1* described in the fourth embodiment.

Thus, the second voltage application means 4d is configured to calculate from the three-phase AC voltage commands vu1*, vv1*, vw1* the three-phase AC voltage commands vuv1*, vvw1*, vwu1* having a phase difference of 30 degrees with respect to the three-phase AC voltage commands vu1*, vw1*, vw1*. So, it is possible to reduce rotating coordinate calculations that intensively use trigonometric function and the like, which provides an effect of reducing a computational load on a microcomputer.

Sixth Embodiment

Next, an electrically-assisted power steering apparatus in accordance with a sixth embodiment of the invention is described. In the first to fifth embodiments, the control apparatus for AC rotating machine is described. Furthermore, an electrically-assisted power steering apparatus may be configured such that the control apparatus for AC rotating machine generates a torque for assisting a steering torque.

The electrically-assisted power steering apparatus provided with the control apparatus for AC rotating machine includes the first voltage application means 3 and the second voltage application means 4 (4b, 4c, 4d), which can provide an electrically-assisted power steering apparatus for preparing for eventualities that can continuously generate a torque for assisting a steering torque even when any one of the voltage application means stops due to a failure.

Figure 9:
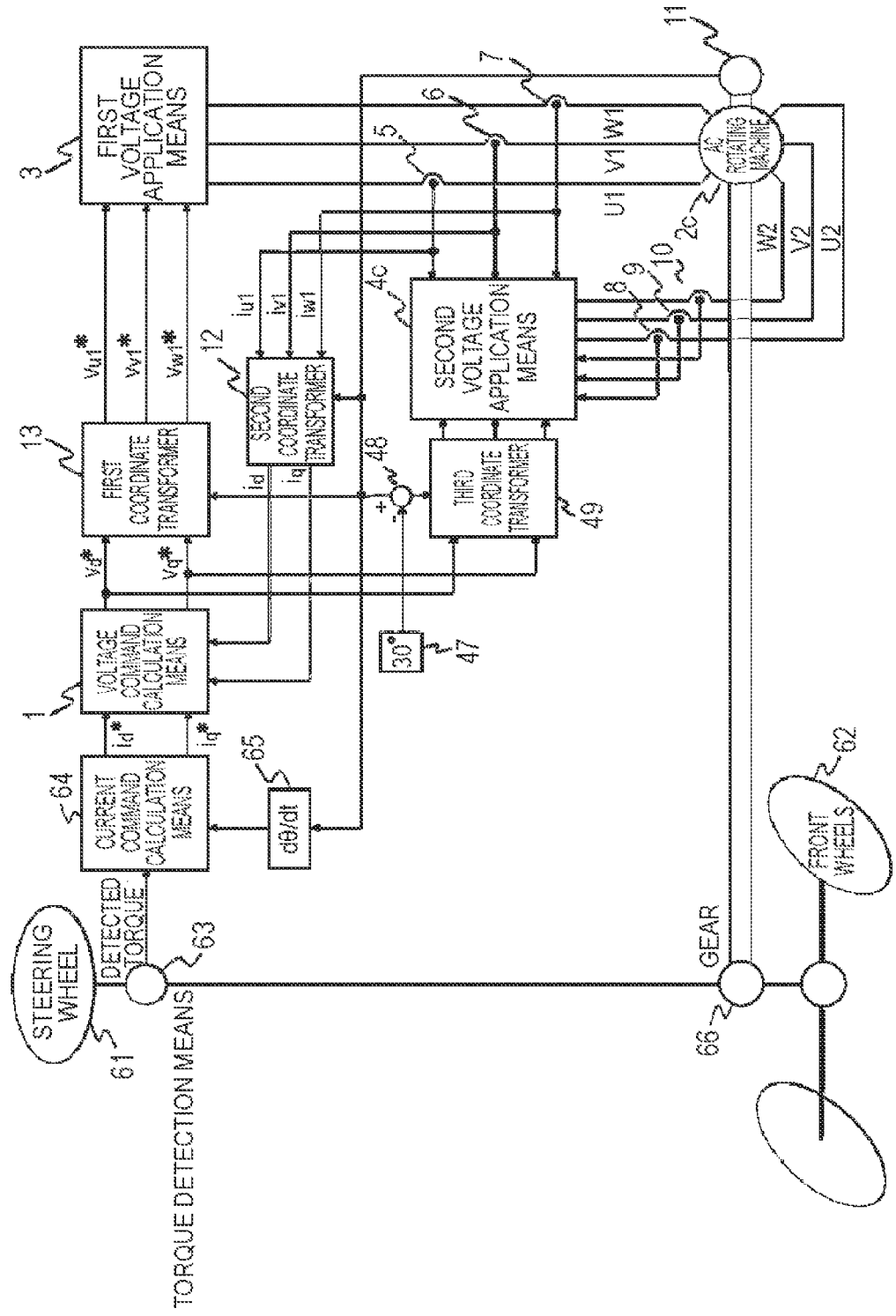
FIG. 9 is a diagram showing an overall configuration of an electrically-assisted power steering apparatus in accordance with a sixth embodiment of the invention.

FIG. 9 shows a configuration of an electrically-assisted power steering apparatus in accordance with the sixth embodiment. Reference numerals also used in any of the first to fifth embodiments denote parts the same as or corresponding to those in any of the first to fifth embodiments, which are not described here.

In FIG. 9, a driver steers front wheels 62 by turning a steering wheel 61 to the left or right. A torque detection means 63 detects a steering torque of the steering system and outputs the detected torque to a current command calculation means 64. The current command calculation means 64 calculates current commands on two rotational axes (d-q axis) id*, iq* to be fed to the AC rotating machine 2c based on the torque detected by the torque detection means 63 and the rotation speed obtained by a rotation speed calculator 65 so that the AC rotating machine 2c generates a torque for assisting the steering torque of the steering system. The AC rotating machine 2c generates a torque for assisting the steering torque via a gear 66.

Thus, the electrically-assisted power steering apparatus in accordance with the sixth embodiment includes the first voltage application means 3 and the second voltage application means 4c, which can provide an effect of continuously generating a torque for assisting the steering torque even when any one of the voltage application means stops due to a failure.

Furthermore, in the electrically-assisted power steering apparatus in accordance with the sixth embodiment, the multiple-winding AC rotating machine 2c having a phase difference of 30 degrees between the windings is configured to generate a torque for assisting the steering torque, which can provide an effect of reducing ripple perceived in steering the steering wheel and reducing machine sound while steering.

Furthermore, also on the electrically-assisted power steering apparatus in accordance with the sixth embodiment, both the first voltage application means 3 and the second voltage application means 4 are configured to apply voltages to the windings based on the voltage commands on two rotational axes calculated by the voltage command calculation means 1. So, it is possible to reduce rotating coordinate calculations that intensively use trigonometric function and the like, which provides an effect of reducing a computational load on a microcomputer.

Furthermore, the second voltage application means 4c is configured to apply voltages to the second windings U2, V2, W2 of the AC rotating machine 2c based on the deviations between the currents fed to the first windings U1, V1, W1 and the currents fed to the second windings U2, V2, W2. So, the second voltage application means 4c operates so that the currents fed to the second windings U2, V2, W2 correspond with the currents fed to the first windings U1, V1, W1, which can suppress interference between the currents fed by the inverters (not shown in FIG. 6) due to magnetic coupling between the windings of each set. This can provide an effect of maintaining highly responsive current control even with a multiple-winding AC rotating machine.

The first to sixth embodiments of the invention have been described. However, these embodiments are not intended to limit the invention. Any of these embodiments may be combined or may be appropriately modified or omitted within the scope of the invention.

The invention claimed is:

1. A control apparatus for a multiple-winding AC rotating machine comprising:
    a voltage command calculator configured to calculate voltage commands on two rotational axes;
    a first voltage application module configured to apply voltages to a first set of multiple-phase windings of the AC rotating machine having at least the first set of multiple-phase windings and a second set of multiple-phase windings based on the voltage commands; and
    a second voltage application module configured to apply voltages to the second set of multiple-phase windings based on the voltage commands
    and deviations between currents fed to the first set of multiple-phase windings and currents fed to the second set of multiple-phase windings.

2. The control apparatus for AC rotating machine according to claim 1,
    wherein the second voltage application module calculates the deviations between the currents fed to the first windings and the currents fed to the second windings for each of multiple phases of the AC rotating machine, and
    wherein the second voltage application module feeds back the deviations to values obtained by coordinate transforming the voltage commands into phase voltage commands for each of multiple phases of the AC rotating machine.

3. The control apparatus for AC rotating machine according to claim 1,
wherein the AC rotating machine has multiple phases, and
wherein the second voltage application module applies voltages with a predetermined phase difference with respect to the voltages applied by the first voltage application module, and feeds back for each of phases values obtained by subtracting the currents fed to the second set of the multiple-phase windings from the current having the predetermined phase difference with respect to the currents fed to the first set of multiple-phase windings.

4. The control apparatus for AC rotating machine according to claim 3, wherein, with any positive number N, the second voltage application module is configured such that currents having an electrical phase difference of (30+60×N) degrees with respect to the currents fed to the first set of multiple-phase windings are calculated from the deviations among the phases of the currents fed to the first windings, and then the values obtained by subtracting the currents fed to the second set of multiple-phase windings from the currents having a phase difference of (30+60×N) degrees are fed back to the voltages having an electrical phase difference of (30+60×N) degrees with respect to the voltages applied by the first voltage application module for each of the phases.

5. An electrically-assisted power steering apparatus comprising a control apparatus for AC rotating machine according to claim 1.

* * * * *